Sept. 4, 1956 J. W. McGRATH 2,762,015
TEST APPARATUS FOR ELECTRICAL UNITS
Filed June 26, 1952 4 Sheets-Sheet 1

INVENTOR
J. W. McGRATH
BY W.C.Parnell
ATTORNEY

Sept. 4, 1956   J. W. McGRATH   2,762,015
TEST APPARATUS FOR ELECTRICAL UNITS
Filed June 26, 1952   4 Sheets-Sheet 2

INVENTOR
J W McGRATH
BY  W.C. Parnell
ATTORNEY

Sept. 4, 1956 J. W. McGRATH 2,762,015
TEST APPARATUS FOR ELECTRICAL UNITS
Filed June 26, 1952 4 Sheets-Sheet 3
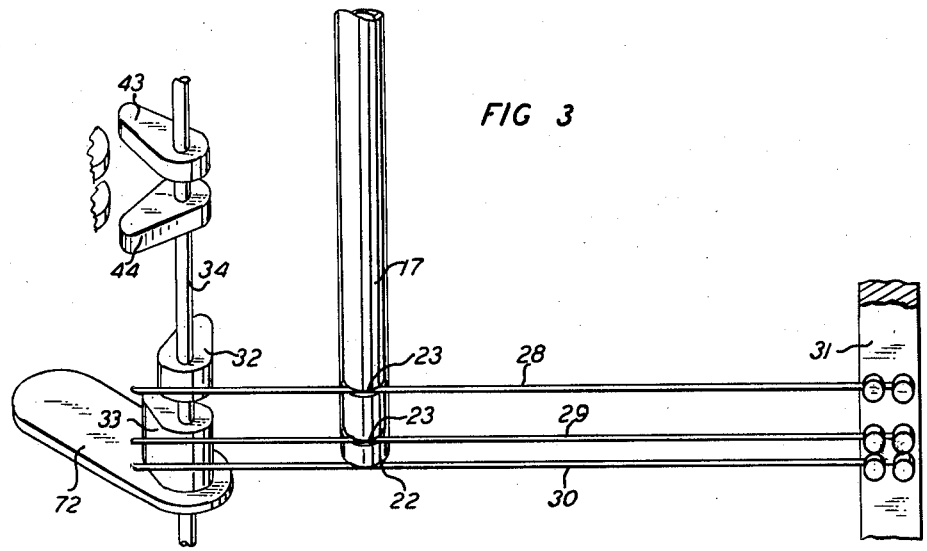
FIG 3
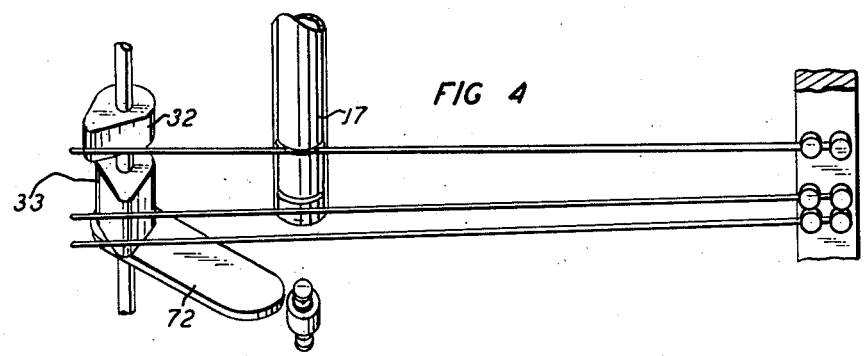
FIG 4
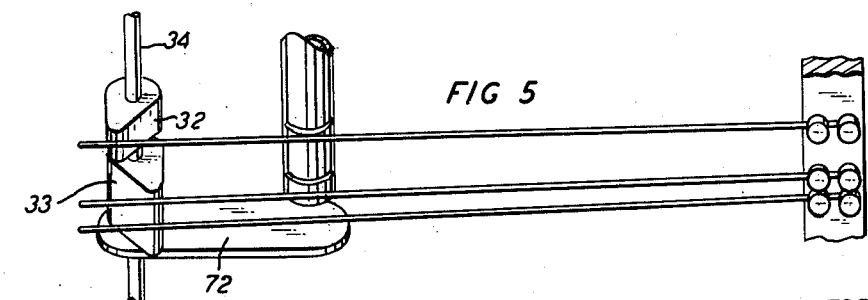
FIG 5
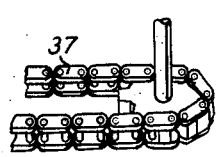
INVENTOR
J. W. McGRATH
BY
ATTORNEY

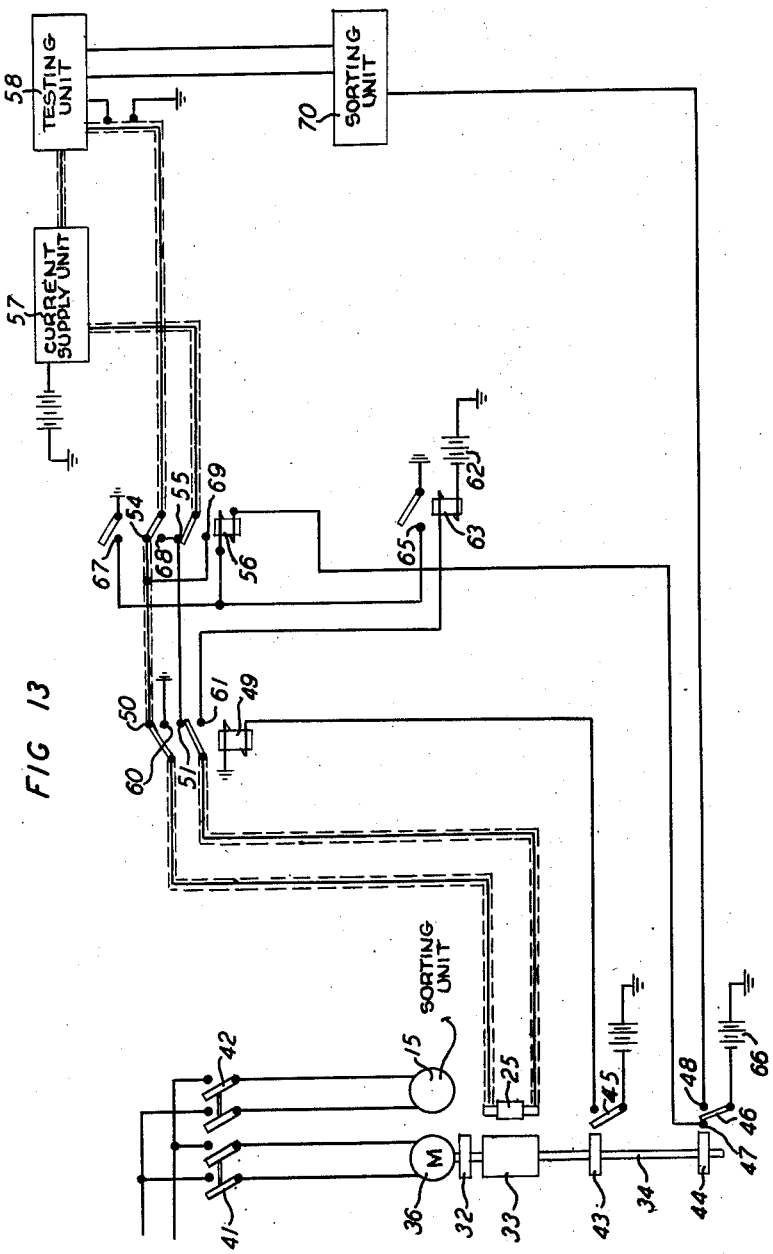

United States Patent Office 2,762,015
Patented Sept. 4, 1956

2,762,015

TEST APPARATUS FOR ELECTRICAL UNITS

John W. McGrath, Allentown, Pa., assignor to Western Electric Company, Incorporated, New York, N. Y., a corporation of New York Application June 26, 1952, Serial No. 295,766

5 Claims. (Cl. 324—158)

This invention relates to testing apparatus for electrical units and more particularly to testing apparatus for determining the electrical characteristics of asymmetrically conducting resistors commonly called varistors.

As is well known, varistors in the forward or conducting direction have an initial resistance which decreases as the current passing through them increases and in the reverse direction their resistance is relatively very high. Commercially known units suitable for feeding varistors from a supply hopper along a given path or through a chute are available, but they are delivered in random orientation. When varistors are to be tested for conductivity in a given direction, it is of course, essential that each one be connected into the test circuit in the proper polarity.

The object of the present invention is an apparatus capable of automatically feeding successive electrical units to a testing position and connecting them into a test circuit in a desired polarity.

With this and other objects in view, the invention comprises an apparatus for feeding like electrical units, having spaced contacts, successively in a given path, a testing unit and means to engage the contacts of the successive units to include them in the testing unit.

More specifically, the apparatus includes a tube, to receive the articles in stacked formation, notched to cooperate with three spring like wires under the control of cams, one of the wires acting to retain the stack of articles against advancement until a supporting table is moved beneath the tube while the other wires are included in a circuit leading to the testing unit to engage the terminals of each article when in testing position and hold the article to the completion of the test when it is released by a cam.

Other objects and advantages will be apparent from the following detailed description when considered in conjunction with the accompanying drawings, wherein:

Figs. 3, 4 and 5 are isometric views showing the functions of the wires and associated cams in the feeding means;

Fig. 13 is a schematic illustration of the testing and sorting units with the other controlling circuits.

Figure 1:
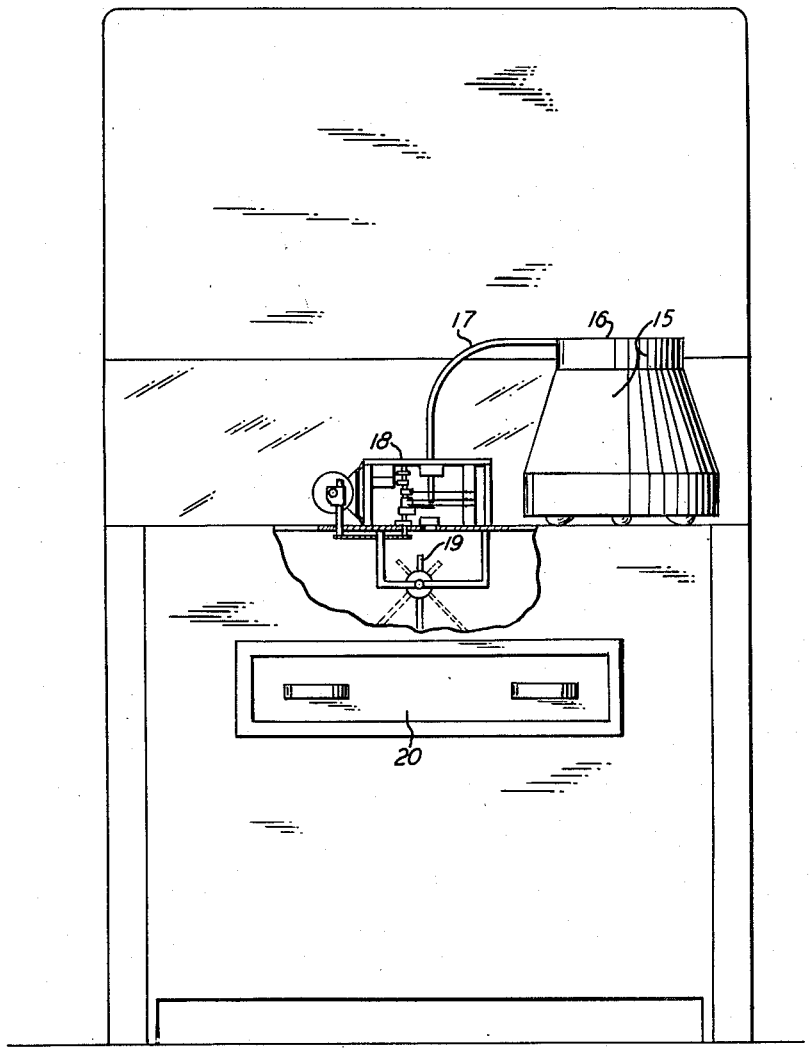
Fig. 1 is a front elevational view of the apparatus.

Referring now to the drawings, attention is first directed to Fig. 1 which illustrates a sorting unit 15 of a commercially known type which is electrically operated, creating vibrations in the article receiving portion 16 thereof, whereby the articles will be fed singly through a tube 17. The tube 17 extends into a housing 18 where the articles are singly included in a test circuit and as a result of the test, an element 19 is actuated to sort the articles into different compartments of a tray 20 depending upon their electrical characteristics.

The tube 17 terminates at 22 and is provided with laterally extending slots 23 which are spaced given distances from the lower end of the tube 22. The spacing of the slots are determined by the contours of the articles under test.

Figure 2:
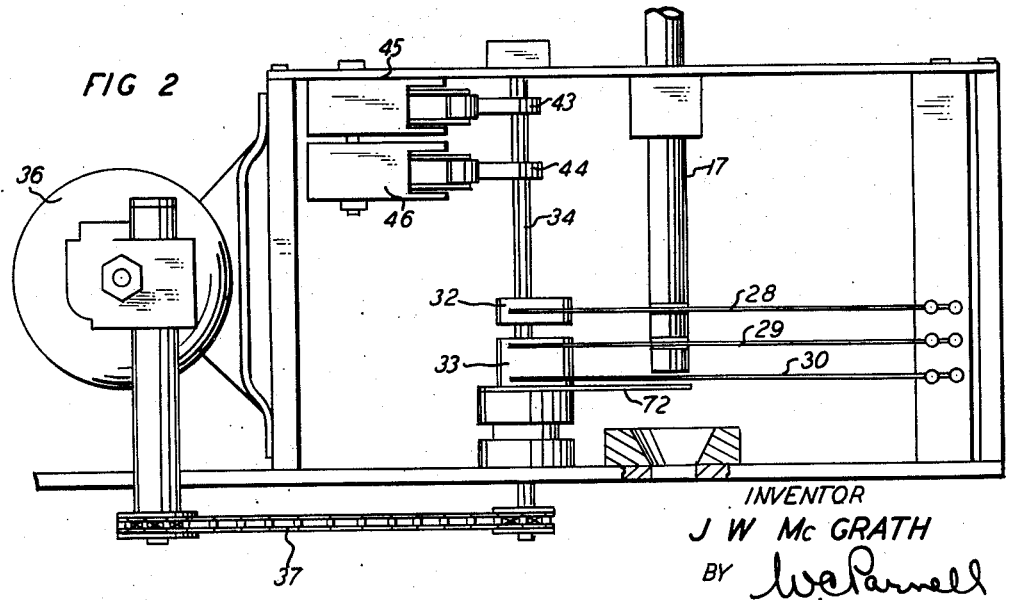
Fig. 2 is a vertical sectional view of a portion of the apparatus.

In the present embodiment of the invention, the article or electrical unit 25 which is to be tested is a varistor having ferrules or contacts 26 of conductive material disposed at the ends thereof and during testing and sorting operations, the unit 15 will feed the articles successively to the tube 17. Spring like wires 28, 29 and 30 are disposed at parallel spaced positions with their like ends mounted on a stationary member 31. The free ends of the wires extend beyond the tube 17 where the wire 28 is under the control of a cam 32 and the wires 29 and 30 are under the control of a cam 33. The cams 32 and 33 are mounted on a cam shaft 34 which is driven by a motor 36 through a sprocket and chain connection 37 (Figs. 2 and 5).

Referring now to the wiring diagram in Fig. 13, it will be noted that by closing switches 41 and 42, electrical circuits will be completed to the motor 36 and the feeding unit 15. The motor may be driven at a given speed or provided with a gear reducing unit whereby the cam shaft 34 is driven at a desired speed. The cam shaft 34, in addition to supporting cams 32 and 33, has cams 43 and 44 mounted thereon to operate switches 45 and 46 at predetermined time intervals prior to and subsequent to the testing of each article. The switch 45 is normally open while the switch 46 normally engages contact 47 and is movable by the cam into engagement with contact 48. The switch 45 when closed, completes a circuit through relay 49 breaking contacts 50 and 51 in a shielded circuit leading from an article 25, when in the test position, through break contacts 54 and 55 of a relay 56 to a unit 57 supplying the test current and through a test unit 58.

Before the article 25 may be subjected to the tests of the unit 58, it must be determined whether or not the article is disposed in the circuit in a forward or reverse conducting direction. This may be determined by a momentary closing of the switch 45 to energize the relay 49 to break contacts 50 and 51 and make contacts 60 and 61, to momentarily complete a circuit from grounded battery 62, through relay 63, contact 61, through the article 25 in one direction, through contact 60 to ground. If this is the forward direction of the article, or varistor, sufficient electrical energy will be permitted to pass through the relay 63 to energize it, closing its contacts 65 and completing a circuit from grounded battery 66, through contact 47 of switch 46, relay 56 closed contact 65 to ground. Energization of the relay 56 will break contacts 54 and 55 and make contacts 67, 68 and 69 to reverse the direction of the testing current through the varistor or article under test, to thereby reverse the polarity of the article so that it may be correctly positioned to receive the necessary test from the unit 58. Closing of contact 67 provides a locking circuit for the relay 56. This condition exists for a length of time suitable for testing unit 58 and sorting unit 70 to function. The gate 19 will respond to the sorting unit to direct the article, when released, into any one of a plurality of compartments depending upon the result of its test. The cam 44, then operates the switch 46 to break contact 47 and make contact 48, thereby releasing the relay 56 and completing a circuit from the battery 66 for resetting the testing and sorting units 70 and 58 to restore the apparatus to its initial condition for testing the next article.

Figure 6:
Figs. 6, 7, 8, 9, 10, 11 and 12 illustrate successive steps in the functions of the spring like wires of the feeding means.
Figure 7:
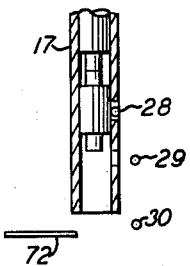
Figure 8:
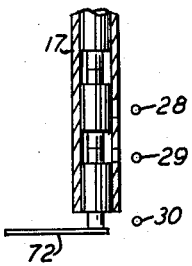
Figure 9:
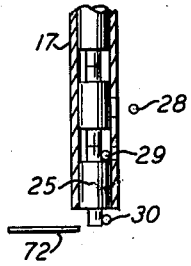
Figure 10:
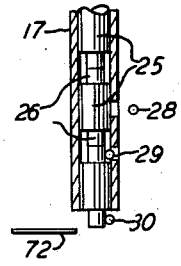
Figure 11:
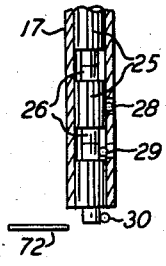
Figure 12:
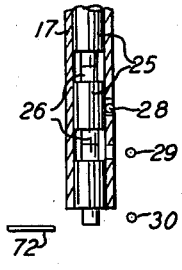

Consider now the operation of the apparatus, it will be apparent that through the normal operation of the unit 15, the articles of varistors 25 are fed through the tube 17 to successively position the articles at the testing position. The functions of the cams 32 and 33 are illustrated not only in Figs. 3, 4 and 5, but may be followed by viewing the successive operating steps illustrated in Figs. 7 to 12 inclusive. Associated with these cams is a table 72, mounted on the cam shaft 34 and arranged to move relative to the tube 17 so as to support the articles in the tube when they are freed by all of the wires 28, 29 and 30. Fig. 6 illustrates the feeding tube just after the tested article has been released and prior to movement of the wire 28 free of the leading article in the tube to allow advancement of the articles. Fig. 7 illustrates the table 72 approaching the tube while in Fig. 8, it illustrates the table positioned beneath the tube when the wire 28 is released. Fig. 9 illustrates the wire 28 being held in its outer position while the wires 29 and 30 are free to engage the ferrules or contacts of the article 25 located in the testing position. Fig. 10 is very similar to Fig. 9 illustrating the position of the wires during testing of the article engaged by the wires 29 and 30 and after the completion of the test. Before the tested article is freed, the wire 28 as shown in Fig. 11, moves into engagement with the next article to hold all of the articles in the tube other than the tested article against advancement while the wires 29 and 30 in Fig. 12 are moved outwardly allowing the tested article to drop.

Shortly after the article reaches test position, the rotation of cam 43 closes the switch 45 for a short interval, thereby operating relay 49 over an obvious circuit. While the relay is held operated, a circuit for relay 63 is established from grounded battery 62 through the relay contact 61 of relay 49 up through the article 25 and contact 60 of relay 49 to ground. If this is the forward or conducting direction of the article, the relay 63 will operate and in turn operate relay 56 over a circuit from grounded battery 66, through contact 47 of switch 46, the winding of relay 56 and contact 65 to ground. The operation of relay 56 locks up through its contact 67, opens contacts 54 and 55 and closes contacts 68 and 69 thereby reversing the polarity of the article 25 with respect to the units 57 and 58. On the other hand, if the article 25 had been conducting in the downward direction, relays 63 and 56 would not have operated and the polarity of the connections between the article and the test unit would be as shown in the drawing when the cam 43 opens the switch 45 and releases the relay 49.

From the foregoing description, it will be apparent that articles similar in appearance although different in electrical characteristics, may be fed successively to a testing position and under the control of cam actuated spring like wires, the articles may be placed in position for test but prior to the completion of the testing circuits, the articles, although not physically oriented, are checked with respect to the testing circuit and connected therein in a desired polarity prior to the starting of the tests. All of this takes place automatically to assure accurate inclusion of each article in the testing circuit.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed:

1. In an apparatus for testing electrical units having spaced contacts, a track for feeding the units singly in a given path to a testing position, a cam, a driver for the cam, resilient elements normally urged to engage the contacts of the leading unit in the track and hold it in the testing position, means connected to the elements to test the unit in the testing position, said cam actuating the elements to free the tested unit and a stop driven by the driver for the cam movable across the track to locate the next leading unit in the testing position.

2. In an apparatus for testing electrical units having spaced contacts, a track for feeding the units singly in a given path to a testing position, two cams, a driver for the cams, resilient elements normally urged to engage the contacts of the leading unit in the track and hold it in the testing position, means connected to the elements to test the unit in the testing position, a resilient member movable to engage the next to the leading unit in the track to hold it and the succeeding units against movement, controlled by one of said cams and the other cam for actuating the elements engaging the contacts of the tested unit to free the tested unit.

3. In an apparatus for testing electrical units having spaced contacts, a tube for feeding the units in a given path to a testing position, part of the tube being cut away at the testing position, two cams, a driver for the cams, a resilient element normally urged to engage each of the contacts of the leading unit in the cut-away part of the tube and hold it in the testing position, means connected to the elements to test the unit in the testing position, a resilient member movable to engage the next to the leading unit to hold it and the succeeding units against movement, one of the cams for actuating the elements engaging the tested unit to free the tested unit, and a stop driven by the driver for the cams movable transversely of the tube to locate the next leading unit in the testing position, and the other cam for moving the resilient member away from the next to the leading unit to free the units for advancement to the stop.

4. In an apparatus for testing asymmetric electrical units having spaced contacts, means to feed the units successively to a testing position, means for applying a preliminary test potential of fixed polarity to a unit in test position, a testing unit, a circuit adapted to electrically connect the electrical unit while in the testing position with the testing unit and switching means controlled by current through the unit when the preliminary potential is applied thereto for controlling the direction of current flow through the unit when it is connected in the circuit with the testing unit while the unit remains under test.

5. In an apparatus for testing asymmetric electrical units having spaced contacts, means to feed the units successively to a testing position, a preliminary test circuit for applying a preliminary test potential of fixed polarity to a unit in test position, a testing unit, a circuit adapted to electrically connect the electrical unit in the testing position with the testing unit, means for sequentially connecting the unit in test position in the preliminary test circuit and in the circuit for connecting the unit to the testing unit and switching means controlled by current through the unit when the preliminary potential is applied thereto for controlling the direction of current flow through the unit when it is connected in the circuit with the testing unit while the unit remains under test.

References Cited in the file of this patent
UNITED STATES PATENTS

| 508,069 | Whiting | Nov. 7, 1893 |
| 755,669 | Hutchison | Mar. 29, 1904 |
| 2,468,843 | Sunstein | May 3, 1949 |